UNITED STATES PATENT OFFICE.

WILHELM NEELMEIER AND AUGUST SIGWART, OF LEVERKUSEN, NEAR COLOGNE, GERMANY, ASSIGNORS TO SYNTHETIC PATENTS CO., INC., OF NEW YORK, N. Y., A CORPORATION OF NEW YORK.

AZO DYES.

1,128,813.   Specification of Letters Patent.   Patented Feb. 16, 1915.

No Drawing.   Application filed February 25, 1914.   Serial No. 820,883.

*To all whom it may concern:*

Be it known that we, WILHELM NEELMEIER and AUGUST SIGWART, doctors of philosophy, chemists, citizens of the German Empire, residing at Leverkusen, near Cologne-on-the-Rhine, Germany, have invented new and useful Improvements in New Azo Dyes, of which the following is a specification.

We have found that new and valuable azo dye-stuffs can be obtained on starting from a derivative of the 2-naphthol-6-sulfonic acid having most probably the following general formula:

R meaning an organic radical which does not further couple in these combinations with a diazo compound, such as of ammonia ($-NH_2$), phenol ($-OC_6H_5$), cresol ($-OC_6H_4CH_3$), amin ($-NHCH_3$), naphthol ($-OC_{10}H_7$), anilin ($-NHC_6H_5$);

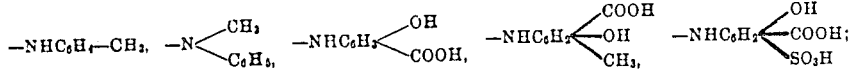

of 4-chloro-2-aminophenol-6-sulfonic acid

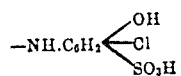

etc.

The above mentioned hitherto unknown derivatives of the 2-naphthol-6-sulfonic acid can be obtained by condensing the sulfonylchlorid of the 2-naphthol-1-carboxylic acid with phenols, ammonia, amins, aminosalicylic acid, etc., and splitting off the carboxylic group. In case the products which still contain this group are coupled the carboxylic group is eliminated in the process of combination. These compounds can be combined with one molecule of a diazo compound, diazoazo compound or two molecules with a tetrazo compound, or an intermediate product from a tetrazo compound and one molecule of an azo dyestuff component.

The new coloring matters dye wool from an acid bath in orange-red to blue to black shades fast to light, to milling and to washing. The dyestuffs of this group as far as they possess the property of forming lakes by after treatment with chromates change into bluer tints remarkable for their excellent fastness to milling and washing. They are after being dried and pulverized generally from reddish to black powders soluble in water and in concentrated sulfuric acid generally with a reddish to brownish-black coloration. They yield upon reduction with zinc powder and acetic acid an amino-2-naphthol-6-sulfonic acid compound substituted in the sulfonic group by a residue of an amin or a phenol which is free from diazotizable amino groups.

In order to illustrate the new process more fully the following examples are given, the parts being by weight:

Example 1: 300 parts of 2-naphthol-6-sulfonyl-phenyl-ether:

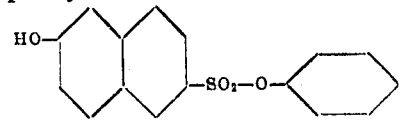

are dissolved in water with 40 parts of sodium hydrate. Sodium carbonate is added to this solution in excess and then the diazo compound prepared with nitrit and HCl from 173 parts of ortho-sulfanilic acid while the solution is being continuously stirred. The dyestuff thus produced separates mostly. It is salted out and filtered off. It has the following graphically represented formula:

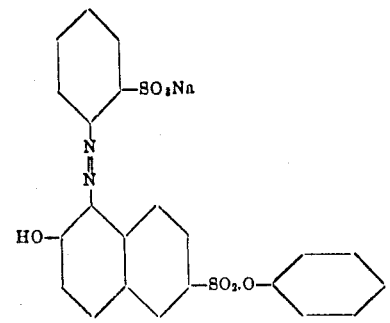

It forms after being dried a yellowish-red powder and dyes wool in pure orange shades very fast to milling.

In quite an analogous manner the condensation products with the homologues of the phenolether or with the naphtholethers, and the sulfonic acids and substitution products of these compounds may be used. Instead of the diazo compound mentioned in the example, any other diazo body may be employed.

Example 2: 299 parts of 2-naphthol-6-sulfanilid:

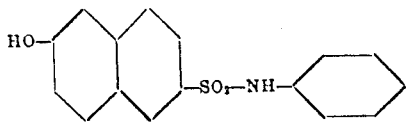

are dissolved in water with 40 parts of sodium hydrate. An excess of sodium carbonate is added to this solution and then the diazo compound prepared from 203 parts of 2-anisidin-4-sulfonic acid, the solution being continuously stirred. When the combination is complete the dyestuff is salted out and filtered off. It has the following graphically represented formula:

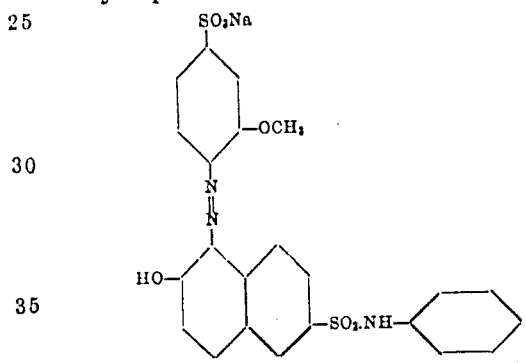

After being dried and crushed it forms a brownish-red powder which yields on wool pure yellowish-red shades very fast to milling and it differs in this respect from the dyestuff obtained from 2-naphthol-6-sulfonic acid.

Instead of the condensation compound of the 2-naphthol-1-carboxyl-6-sulfonylchlorid with anilin the condensation products with other amins, such as naphthylamins, with the homologues and substitution products of anilin e. g. toluidin, methylanilin, sulfanilic acid, etc. may be used as coupling components; likewise other diazo-compounds, diazoazo compounds tetrazo compounds or intermediate compounds obtainable by the action of one molecule of a tetrazo compound with one molecule of an azo-dyestuff component.

Example 3: 359 parts of 2-naphthol-6-sulfonyl-salicylamid:

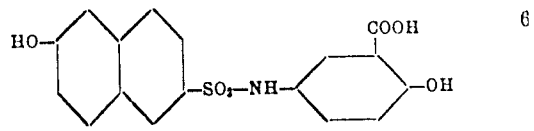

are dissolved in an excess of sodium carbonate and the diazo compound prepared from 223 parts of 1-naphthylamin-4-sulfonic acid is added to this solution while it is being stirred. When the coupling is finished the dyestuff is salted out and collected on a filter. It yields on wool a red which changes on being aftertreated with acetate of chrome into a bluish-red of excellent fastness to milling. The new dyestuff has in a free state most probably the formula:

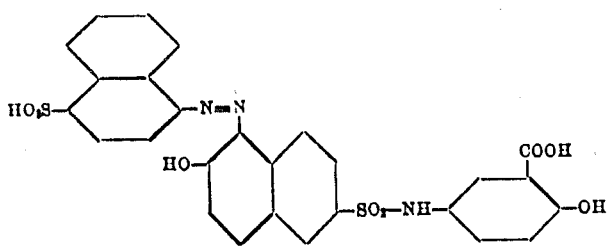

It is after being dried and pulverized in the shape of its sodium salt a reddish powder soluble in water and in concentrated sulfuric acid with a reddish coloration. Upon reduction with zinc powder and acetic acid it yields 1-naphthylamin-4-sulfonic acid and 1-amino-2-naphthol-6-sulfonylsalicylamid.

Similar dyestuffs of the same good properties can be obtained on using the condensation products of the 2-naphthol-1-carboxyl-6-sulfonyl-chlorid with other amino-ortho-oxy-carboxylic acids e. g. the amino-cresotinic acids, or with their derivatives e. g. the 5-sulfonyl-3-amino-6-oxybenzoic acid or the condensation products with other aminophenols for instance with the 4-chloro-2-aminophenol-6-sulfonic acid other diazo compounds, tetrazo compounds etc. may be used.

We claim:

1. The new azodyes which are after being dried and pulverized generally from reddish to black powders soluble in water and in concentrated sulfuric acid generally with a reddish to brownish-black coloration; yielding upon reduction with zinc powder and acetic acid an amino-2-naph thol-6-sulfonic acid compound substituted in the sulfonic group by an organic radical which is free from diazotizable amino groups; and dyeing wool from an acid bath generally from orange-red to blue to black which dye is after being dried and pulverized in the shape of its sodium salt a reddish powder soluble in water and in concentrated sulfuric acid with a reddish coloration; yielding upon reduction with zinc powder and acetic acid 1-naphthylamin-4-sulfonic acid and 1-amino-2-naphthol-6-sulfonylsalicylamid; and dyeing wool from an acid bath in red shades fast to milling and to washing which aftertreated with chromates are changed into a bluer shade pure shades fast to milling, substantially as described.

2. The new azodye having in a free state most probably the formula:

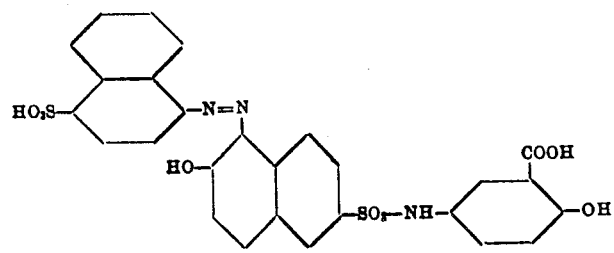

remarkable for its excellent fastness to milling and washing, substantially as described.

In testimony whereof we have hereunto set our hands in the presence of two subscribing witnesses.

WILHELM NEELMEIER.
AUGUST SIGWART.

Witnesses:
HANS BRÜCKNER,
MARTIN HERZBERG.